United States Patent
Fujiwara et al.

(10) Patent No.: US 11,882,340 B2
(45) Date of Patent: Jan. 23, 2024

(54) CONTENT DISTRIBUTION SYSTEM, UNICAST MULTICAST CONVERTER, CONTENT DISTRIBUTION METHOD AND CONTENT DISTRIBUTION PROGRAM

(71) Applicant: NIPPON TELEGRAPH AND TELEPHONE CORPORATION, Tokyo (JP)

(72) Inventors: Toshihito Fujiwara, Musashino (JP); Yasunobu Kasahara, Musashino (JP); Hidekazu Shimizu, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 39 days.

(21) Appl. No.: 17/625,554

(22) PCT Filed: Jul. 10, 2019

(86) PCT No.: PCT/JP2019/027388
§ 371 (c)(1),
(2) Date: Jan. 7, 2022

(87) PCT Pub. No.: WO2021/005756
PCT Pub. Date: Jan. 14, 2021

(65) Prior Publication Data
US 2022/0295155 A1   Sep. 15, 2022

(51) Int. Cl.
*H04N 21/6405* (2011.01)
*H04L 65/611* (2022.01)
(Continued)

(52) U.S. Cl.
CPC ....... *H04N 21/6405* (2013.01); *H04L 65/611* (2022.05); *H04L 65/80* (2013.01); *H04N 21/6408* (2013.01)

(58) Field of Classification Search
CPC .......... H04N 21/6405; H04N 21/6408; H04N 21/64707; H04N 21/64322; H04L 65/611;
(Continued)

(56) References Cited

U.S. PATENT DOCUMENTS 9,414,095 B1 * 8/2016 Corda ................. G11B 27/10
2009/0147718 A1   6/2009 Liu et al.
(Continued)

FOREIGN PATENT DOCUMENTS

JP   2006303965 A   11/2006
JP   4665007 B2   4/2011
(Continued)

OTHER PUBLICATIONS

S. Deering, "Host Extensions for IP Multicasting", RFC 1112, Aug. 1989.

*Primary Examiner* — Oanh Duong
(74) *Attorney, Agent, or Firm* — Harness, Dickey & Pierce, P.L.C.

(57) ABSTRACT

The present disclosure is intended to enable efficient content forwarding in an HTTP-based web distribution system while maintaining HTTP, which is unicast. In the present disclosure, a unicast-multicast conversion device and a multicast-unicast conversion device that are connected, by using a multicast communication network, with a network between a content server and a terminal that perform web distribution are provided. The unicast-multicast conversion device and the multicast-unicast conversion device execute, in both multicast and unicast, forwarding of a content group into which a plurality of contents are grouped.

13 Claims, 12 Drawing Sheets

(51) Int. Cl.
*H04L 65/80* (2022.01)
*H04N 21/6408* (2011.01)

(58) Field of Classification Search
CPC ....... H04L 65/80; H04L 65/612; H04L 67/02;
H04L 12/18; H04L 65/1073; H04L 65/65;
H04L 12/185; H04L 12/1868; H04W 4/06
See application file for complete search history.

(56) References Cited

U.S. PATENT DOCUMENTS

| | | |
|---|---|---|
| 2013/0007825 A1 | 1/2013 | Liu et al. |
| 2013/0114597 A1* | 5/2013 | Ogisawa ................. H04L 67/02 370/390 |
| 2015/0381675 A1* | 12/2015 | Damola ................ H04L 65/611 709/219 |
| 2016/0205185 A1* | 7/2016 | Gampel .............. H04L 61/5007 709/218 |
| 2020/0021972 A1* | 1/2020 | Slater .................... H04W 36/32 |

FOREIGN PATENT DOCUMENTS

| | | | |
|---|---|---|---|
| JP | 4814998 B2 | 11/2011 | |
| JP | 201975741 A | 5/2019 | |
| WO | WO-2012011449 A1 | 1/2012 | |
| WO | WO-2013127423 A1 * | 9/2013 | ......... H04L 65/1083 |

* cited by examiner

Fig. 11
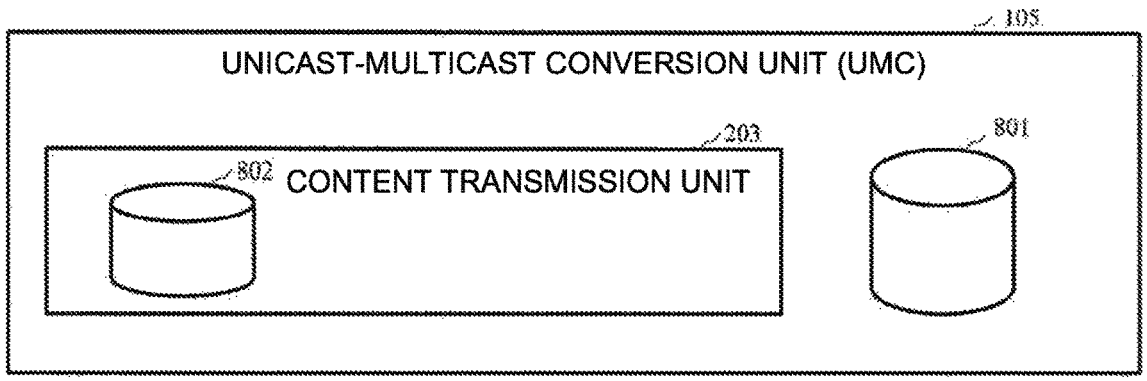
Fig. 12
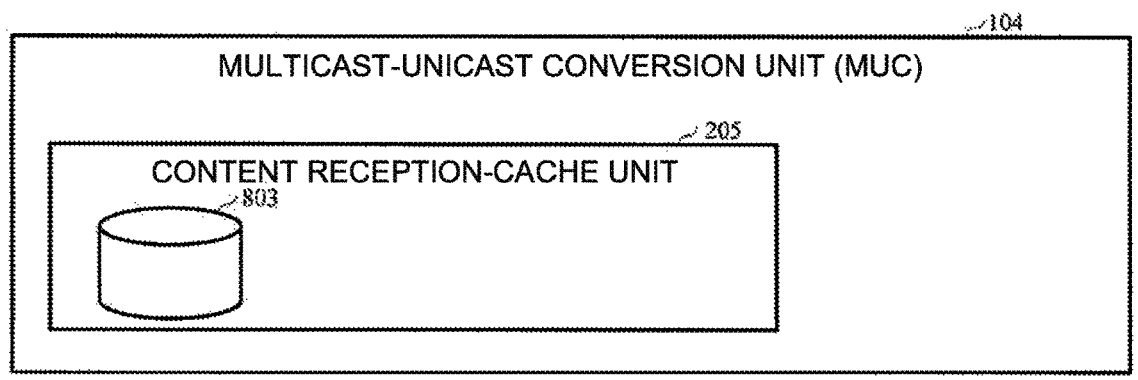
Fig. 13
| MULTICAST IDENTIFIER | USING CONTENT GROUP | USING MUC |
|---|---|---|
| MULTICAST IDENTIFIER IDM1 | UNUSED | UNUSED |
| MULTICAST IDENTIFIER IDM2 | CONTENT GROUP IDG1 | 104 |
| MULTICAST IDENTIFIER IDM3 | CONTENT GROUP IDG2 | 104 |
| MULTICAST IDENTIFIER IDM4 | UNUSED | UNUSED |
| ... | ... | ... |
| MULTICAST IDENTIFIER IDMn | UNUSED | UNUSED |

| USING CONTENT GROUP | MULTICAST IDENTIFIER |
|---|---|
| CONTENT GROUP IDG1 | MULTICAST IDENTIFIER IDM2 |
| CONTENT GROUP IDG2 | MULTICAST IDENTIFIER IDM3 |
| AVAILABLE | AVAILABLE |
| AVAILABLE | AVAILABLE |
| ... | ... |
| AVAILABLE | AVAILABLE |

CONTENT DISTRIBUTION SYSTEM, UNICAST MULTICAST CONVERTER, CONTENT DISTRIBUTION METHOD AND CONTENT DISTRIBUTION PROGRAM

CROSS-REFERENCE TO RELATED APPLICATIONS

This application is a 371 U.S. National Phase of International Application No. PCT/JP2019/027388 filed on Jul. 10, 2019. The entire disclosure of the above application is incorporated herein by reference.

TECHNICAL FIELD

The present disclosure relates to a method of converting, from unicast to multicast, and from multicast to unicast, a plurality of unicast traffics having destinations different from each other and content identifiers identical to each other.

BACKGROUND ART

The amount of Internet traffic tends to increase year by year, and increase of video traffic is significant, in particular. Increase of the amount of traffic on the Internet means increase of traffic through networks of communication business operators. For this, content distribution business operators and communication business operators need to make investment in facilities to avoid occurrences of congestion and the like.

Such investment in facilities can be reduced by, for example, efficiently using transmission bands in a network.

A specific method is multicast (Non-Patent Literature 1). Multicast is effective when the same content is distributed to a large number of end users, and the number of consumed transmission bands is small as compared to a case of unicast distribution to each end user. The effect increases as the number of end users at reception is larger, and thus multicast is suitable for a content expected to be received by a large number of end users.

In another technology for a monitoring camera network (Patent Literature 1), a monitoring image transmitted from a monitoring camera by unicast is converted into multicast and transmitted to a monitoring hub.

In another technology, a content transmitted by multicast is converted into unicast. For example, in Patent Literature 2, conversion is performed from multicast to unicast when traffic through an access line by digital subscriber line (DSL) is transmitted in a house through a wireless local area network (LAN). Accordingly, more reliable traffic transmission is achieved in a wireless LAN zone.

CITATION LIST

Patent Literature

Patent Literature 1: Japanese Patent No. 4665007, "Surveillance video transmission apparatus and method"
Patent Literature 2: Japanese Patent No. 4814998, "Method and apparatus for reliably delivering multicast data"

Non-Patent Literature

Non-Patent Literature 1: RFC 1112, "Host Extensions for IP Multicasting"

SUMMARY OF THE INVENTION

Technical Problem

A content distribution service is achieved by a distribution facility, a network, and a receiver terminal. Thus, mutual connection capability needs to be ensured at these devices and facility. The multicast described above has problems with this connection capability.

In such a content distribution service, a condition of input and output traffic needs to be matched at a connection interface (hereinafter referred to as an application server-network interface (SNI)) between the distribution facility and the network and at a connection interface (hereinafter referred to as a user-network interface (UNI)) between the network and the receiver terminal. The condition is also referred to as an interface (IF) condition. Whether the input and output traffic is unicast or multicast is included in the IF condition and needs to be determined at service provision.

Traffic is a content to which various kinds of information for distributing the content is added. For example, when a content is stored and transmitted in an IP packet, a combination of an IP header and a payload in which the content is stored is referred to as traffic.

The following describes a problem when the IF condition for any one or both of the SNI and the UNI is multicast. Traffic from distribution business operators A and B is sent by multicast, and thus the number of consumption bands of the traffic is the number of distribution channels×one receiver terminal, and reduction of the number of transmission bands is achieved. However, in such a case, the distribution facility and the receiver terminal both need to have functions compatible with multicast. Thus, a distribution facility capable of performing multicast distribution and a receiver terminal capable of receiving multicast are needed, and a facility and a terminal that do not have such capabilities cannot be connected.

Although devices compatible with multicast distribution and reception are commercially available, Internet traffic is typically unicast, and thus special settings for the network are needed for the devices to be compatible with multicast distribution and reception, which requires cumbersome operation. To solve this problem, the SNI and the UNI can be set to be both unicast. However, it is desirable that the network is multicast to achieve the above-described efficient use of transmission bands. These are conflicting conditions, and thus a technology for satisfying both conditions is needed.

As an example of such a technology, a content input to the SNI by unicast is converted into multicast and distributed to multiple places in the network, and then converted into unicast at each place again and output from the corresponding UNI. However, video distribution for expectation of unicast often uses Transmission Control Protocol (TCP) and HyperText Transfer Protocol (HTTP) as a higher-level layer. For multicast, for example, User Datagram Protocol (UDP) and Real-time Transport Protocol (RTP) as a higher-level layer are used, and thus simple IP-header conversion is insufficient.

Such operation cannot be achieved by simply combining commercially available technologies of conversion from unicast to multicast and from multicast to unicast as described above.

Thus, the present disclosure is intended to enable efficient content forwarding in an HTTP-based web distribution system while maintaining HTTP, which is unicast.

Means for Solving the Problem

The present disclosure is achieved to solve the above-described problem. According to the present disclosure, a unicast-multicast conversion device, in other words, a unicast-multicast conversion unit (hereinafter referred to as UMC), and a multicast-unicast conversion device, in other words, a multicast-unicast conversion unit (hereinafter referred to as MUC) are provided in a network between a content server configured to perform web distribution and a terminal configured to receive the web distribution, and multicast communication can be used in traffic between the UMC and the MUC. This promotes reduction of investment in server and network facilities and achieves improvement and stabilization of distribution video image quality.

Specifically, a content distribution system according to the present disclosure is a content distribution system in which a midstream zone between a terminal and a content server in a web distribution system of unicast communication is connected by using a multicast communication network, the content distribution system including: a unicast-multicast conversion device configured to convert unicast communication into multicast communication and send the multicast communication to the multicast communication network; and a multicast-unicast conversion device configured to convert multicast communication transmitted through the multicast communication network into unicast communication, the multicast-unicast conversion device includes: a content reception-cache unit configured to identify a content group into which a plurality of contents are grouped, receive, from the multicast communication network, a content transmitted by using any one or both of unicast and multicast communication schemes for each content group, and store a content included in the content group; a unicast transmission unit configured to transmit, based on a request from the terminal, a content stored in the content reception-cache unit to the terminal; and a content request unit configured to selectively make, when a content corresponding to the request from the terminal is not stored in the content reception-cache unit, a demand for a content group including the content corresponding to the request from the terminal by any one or both of unicast and multicast communication schemes, the unicast-multicast conversion device includes: a unicast reception-cache unit configured to receive a content from the content server by using unicast communication and store the content; a content transmission unit configured to read, from the unicast reception-cache unit, a content group corresponding to a request from the content request unit and transmit the read content group to the multicast communication network by using any one or both of unicast and multicast communication schemes; and a unicast request unit configured to make, when a content group corresponding to a request from the multicast-unicast conversion device is not stored in the unicast reception-cache unit, by using unicast communication, a demand on the content server for the content group corresponding to the request from the multicast-unicast conversion device.

Specifically, a unicast-multicast conversion device according to the present disclosure is a unicast-multicast conversion device connected with a midstream zone between a terminal and a content server in a web distribution system of unicast communication and configured to convert unicast communication into multicast communication and send the multicast communication to a multicast communication network, the unicast-multicast conversion device including: a unicast reception-cache unit configured to receive a content from the content server by using unicast communication and store the content; a content transmission unit configured to read, when having received a request for a content group into which a plurality of contents are grouped from a multicast-unicast conversion device configured to convert multicast communication transmitted through the multicast communication network into unicast communication, the content group corresponding to the request from the unicast reception-cache unit and transmit the read content group to the multicast communication network by using any one or both of unicast and multicast communication schemes; and a unicast request unit configured to make, when a content group corresponding to a request from the multicast-unicast conversion device is not stored in the unicast reception-cache unit, by using unicast communication, a demand on the content server for the content group corresponding to the request from the multicast-unicast conversion device.

Specifically, a content distribution method according to the present disclosure is a content distribution method executed by a unicast-multicast conversion device connected with a midstream zone between a terminal and a content server in a web distribution system of unicast communication and configured to convert unicast communication into multicast communication and send the multicast communication to a multicast communication network. The content distribution method includes: receiving a content from the content server by using unicast communication and storing the content in a unicast reception-cache unit; reading, when a content transmission unit has received a request for a content group into which a plurality of contents are grouped from a multicast-unicast conversion device configured to convert multicast communication transmitted through the multicast communication network into unicast communication, the content group corresponding to the request from the unicast reception-cache unit and transmitting the read content group to the multicast communication network by using any one or both of unicast and multicast communication schemes; and making, by a unicast request unit, when a content group corresponding to a request from the multicast-unicast conversion device is not stored in the unicast reception-cache unit, by using unicast communication, a demand on the content server for the content group corresponding to the request from the multicast-unicast conversion device.

Specifically, a content distribution program according to the present disclosure is a computer program for achieving a computer as each functional component included in the unicast-multicast conversion device or the multicast-unicast conversion device according to the present disclosure, and is a computer program for causing a computer to execute each step included in the content distribution method according to the present disclosure.

Effects of the Invention

According to the present disclosure, it is possible to enable efficient content forwarding in an HTTP-based web distribution system while maintaining HTTP, which is unicast.

BRIEF DESCRIPTION OF DRAWINGS

FIG. 11 illustrates a schematic configuration of the UMC of a fifteenth embodiment.

FIG. 12 illustrates a schematic configuration of the MUC of the fifteenth embodiment.

FIG. 13 illustrates an exemplary table image held by a table 801.

FIG. 14 illustrates an exemplary table image held by a table 802 and a table 803.

DESCRIPTION OF EMBODIMENTS

Embodiments of the present disclosure will be described below in detail with reference to the accompanying drawings. Note that the present disclosure is not limited to the embodiments described below. These embodiments are merely exemplary, and the present disclosure may be achieved in a form provided with various kinds of change and modification based on knowledge of the skilled person in the art. Note that components having the same reference sign in the present specification and drawings are identical to each other.

In the present description, a content distributed by a content distribution method according to the present disclosure is assumed to be a video content, but another content (for example, an image, a web page, an update file of an operation system (OS), or a virus software definition file) may be distributed in the present disclosure.

First Embodiment

Figure 1:
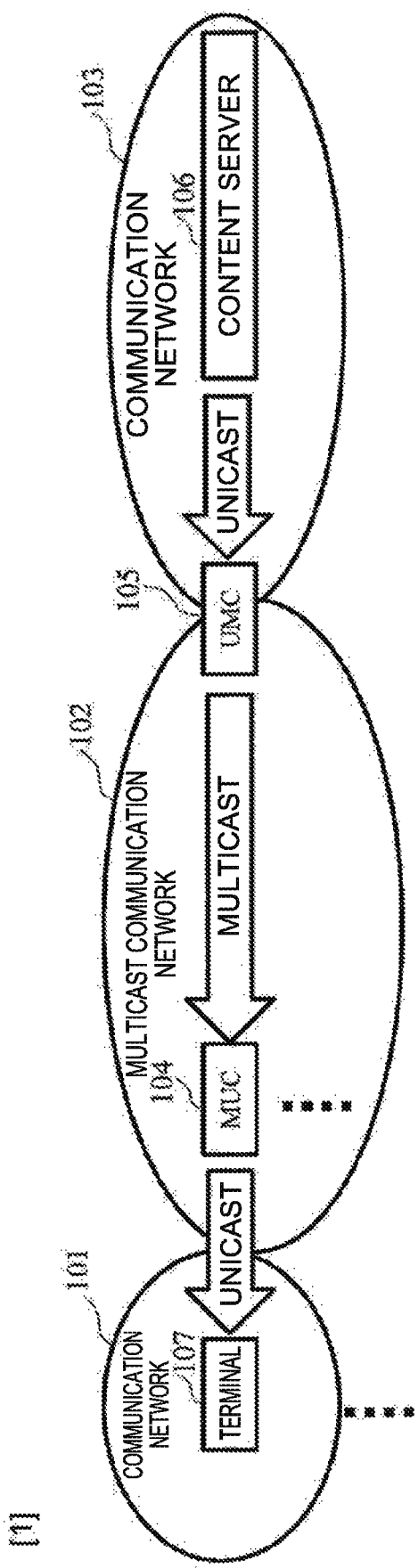
FIG. 1 illustrates an exemplary system configuration according to a first embodiment.

FIG. 1 illustrates an exemplary network configuration provided with the content distribution method according to the present disclosure. A distribution system according to the present disclosure includes a content server 106, a UMC 105, an MUC 104, and a terminal 107. In addition, a multicast communication network 102 as a network through which multicast communication is possible exists between the content server 106 and the terminal 107. In the drawing, a network 101 and a network 103 are separated, but may be a single network.

The UMC 105 is placed at the boundary between the network 103 and the network 102 or in the network 102, and the MUC 104 is placed at the boundary between the network 102 and the network 101 or in the network 102.

In a case in which the UMC 105 and the MUC 104 are not provided, communication between the content server 106 and the terminal 107 is performed by using HTTP as unicast. In the present distribution system, since the UMC 105 and the MUC 104 are provided between the content server 106 and the terminal 107, communication is mainly converted from unicast to multicast at the UMC 105, and communication is mainly converted from multicast to unicast at the MUC 104. Accordingly, according to the present disclosure, it is not needed to change a method of connection between the content server 106 and the terminal 107, which is web distribution. The number of MUCs 104 is equal to or larger than one, and each MUC 104 is connected with zero or more terminals 107.

The MUC 104 mainly converts communication from multicast to unicast, but communication before the conversion includes unicast communication or is unicast communication only in some cases. The UMC 105 mainly converts communication from unicast to multicast, but communication after the conversion includes unicast communication or is unicast communication only in some cases. When the MUC 104 and the UMC 105 only perform unicast communication, the system of the present disclosure is substantially equivalent to a multi-stage web proxy system. The present disclosure is a web proxy system (the UMC 105 and the MUC 104 in the present disclosure) as an application layer in which part (between the UMC 105 and the MUC 104) of communication is adaptively converted into multicast.

Figure 2:
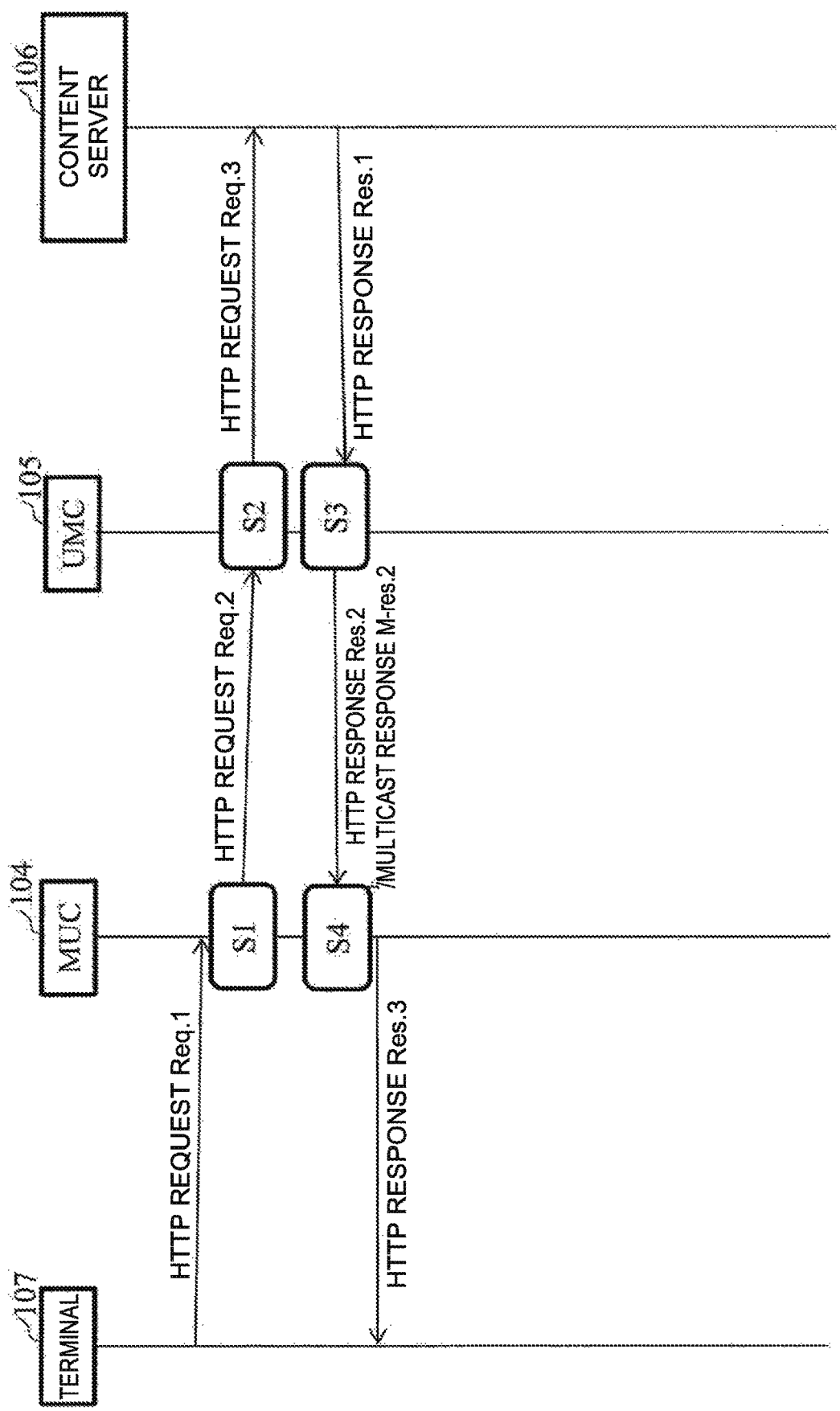
FIG. 2 illustrates a sequence of the first embodiment when an MUC and a UMC have no cache.

FIG. 2 illustrates the process of communication when the MUC 104 and the UMC 105 have no cache. An HTTP request req. 1 from the terminal 107 is transmitted to the MUC 104 as a proxy.

Having received req. 1, the MUC 104 executes step S1. At step S1, the MUC 104 determines that there is no cache corresponding to the HTTP request req. 1 from the terminal 107, and forwards an HTTP request req. 2 to the UMC 105 as a higher-level proxy server. Similarly, at step S2, the UMC 105 determines that there is no cache corresponding to the HTTP request req. 2 from the MUC 104, and forwards an HTTP request req. 3 to the content server 106.

The content server 106 responds a content file corresponding to req. 3 to the UMC 105 by an HTTP response res. 1. Having received res. 1, the UMC 105 executes step S3. At step S3, the UMC 105 generates a cache file by using the content file included in res. 1 and responds the cache file to the UMC 104. The response from the UMC 105 to the MUC 104 is a response corresponding to the HTTP request req. 2 and may be an HTTP response res. 2, a multicast response M-res. 2, or both res. 2 and M-res2.

Having received res. 2 or M-res2, the MUC 104 executes step S4. At step S4, the MUC 104 stores the cache file included in res. 2 or M-res. 2. The MUC 104 responds the stored cache file by an HTTP response res. 3. The response res. 3 is a response to the terminal 107, which corresponds to the HTTP request req. 1. Note that caches at the MUC 104 and the UMC 105 are deleted at appropriate timings due to restriction on the storage capacity of a disk or the like or distribution policy.

By using both messages of Res. 2 as unicast communication and M-res. 2 as multicast communication as described above, the present disclosure is expected to achieve the following effects:

Unnecessary unicast communication is reduced by multicast communication, which reduces a used band in a network and a load on a server. Accordingly, video distribution can be more reliably performed at higher image quality by multicast communication as compared to a case in which only unicast communication is used.

Communicability by conventional unicast communication can be ensured in an environment where multicast communication cannot be established. The environment where multicast communication cannot be established is an environment that does not support multicast communication, or a temporary non-communicable environment such as shortage of multicast addresses and multicast routes or excess of a traffic amount for multicast. In a case of a network in which a multicast route is dynamically generated, a time until playback of a moving image starts can be reduced by performing distribution through unicast communication before the route generation.

Reliability can be improved by using unicast communication for retransmission of multicast communication data. This is because, in particular, when a multicast packet is retransmitted due to a packet loss in a transmission path, reception failure by a receiver (the MUC 104), or the like, the multicast packet is transmitted not only to the MUC 104 at which the loss has occurred but also to any other MUC 104, to reduce a network band and a load on the other MUC 104, and thus it is desirable to perform the retransmission to an individual MUC 104.

Similarly, on a web base, the same file is not necessarily requested by a plurality of terminals 107 at the same timing. Thus, when there is a request from the terminal 107 after a cache is deleted at a particular MUC 104, it is desirable to perform distribution by unicast communication, not by multicast communication. This is because, when a cache file is held by an MUC 104 different from the MUC 104, distribution thereof would be waste.

The present system can perform not only distribution of a real-time content but also distribution of a less real-time content by using a cache.

Figure 3:
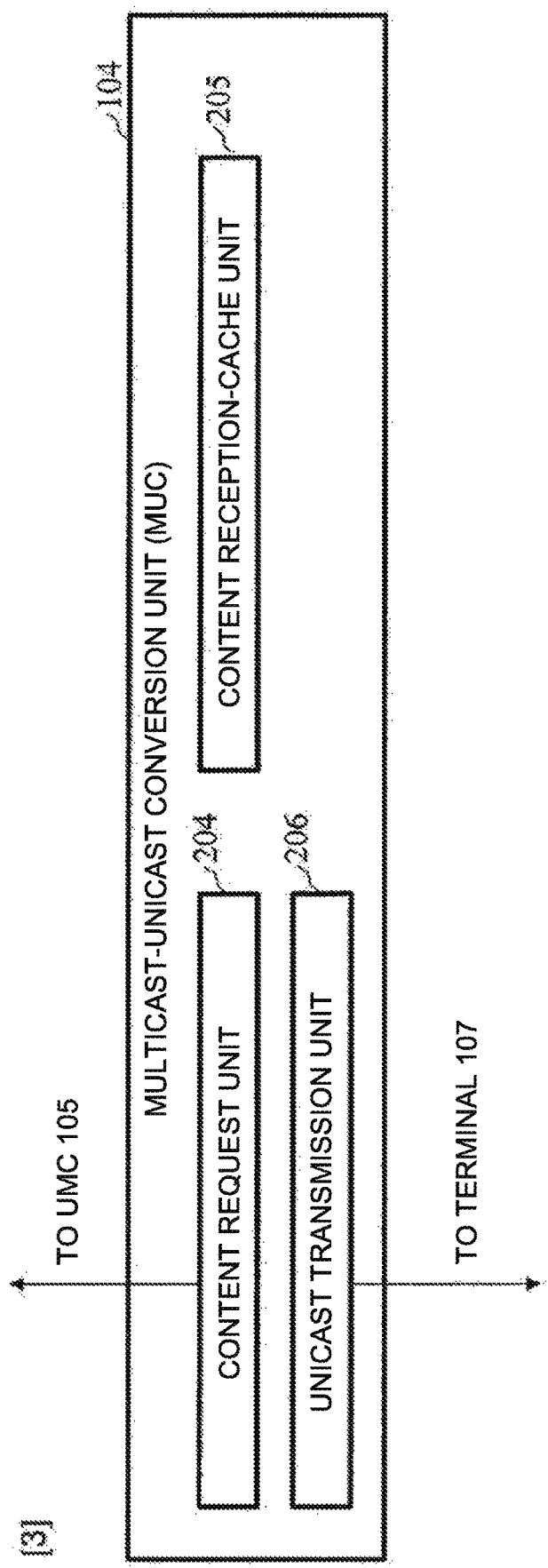
FIG. 3 illustrates exemplary functions of the MUC.

FIG. 3 illustrates exemplary functions of the MUC 104 for executing each step in FIG. 2. The MUC 104 includes a content request unit 204, a content reception-cache unit 205, and a unicast transmission unit 206.

The unicast transmission unit 206 reads a content file corresponding to req. 1 from the content reception-cache unit 205 based on the request req. 1 from the terminal 107 and transmits the content file to the terminal 107 as res. 3 by unicast communication. This cache is a file or a stream in HTTP. The cache does not necessarily need to be a complete file, but only partial data can be sequentially transmitted as unicast communication. Accordingly, the terminal 107 can perform communication with the unicast transmission unit 206 of the MUC 104 through processing similarly to processing of directly transmitting an HTTP request to the content server 106 and receiving an HTTP response therefrom.

When there is no cache corresponding to the request from the terminal 107, the content request unit 204 makes a demand for a content on the UMC 105 by req. 2. The demand is selectively made by both or one of unicast and multicast communication schemes. For example, the demand uses a HTTP request, and a selective demand is distinguished by using an HTTP header.

The content reception-cache unit 205 identifies the content requested by the content request unit 204 as a content group into which a plurality of contents are grouped, and selectively receives and caches the content by both or one of the unicast and multicast communication schemes for each content group. A content is, for example, a file. In a web distribution system, a program is sometimes made of a plurality of files, and thus when the program is converted into a stream of multicast or the like, a plurality of files can be handled as one content group to efficiently perform conversion into multicast communication. Thus, forwarding of different files of one program can be performed with the same multicast source address and the same group address, which is an advantage.

In a case in which the content reception-cache unit 205 selectively performs reception by both or one of the unicast and multicast communication schemes, for example, unicast communication is performed before a multicast path is established or in a network in which multicast cannot be forwarded for some reason, and then multicast communication is performed after a multicast path is established.

Alternatively, the selective reception is a case in which, for example, when multicast communication cannot be received for some reason, data is forwarded only to an MUC 104 that cannot receive the multicast communication. The case in which multicast communication cannot be received is, for example, a case of reception error such as a packet loss, a case in which reacquisition is needed due to cache-out at an MUC 104 after multicast reception, or a case in which data cannot be acquired because multicast is distributed from the UMC 105 but the MUC 104 is not prepared to receive the multicast.

Multicast communication and unicast communication can be combined in this manner to efficiently utilize network facilities and bands by using multicast communication for a content of high multi-addressing nature and immediacy and using unicast communication for error recovery or a content of low multi-addressing nature or low immediacy.

Figure 4:
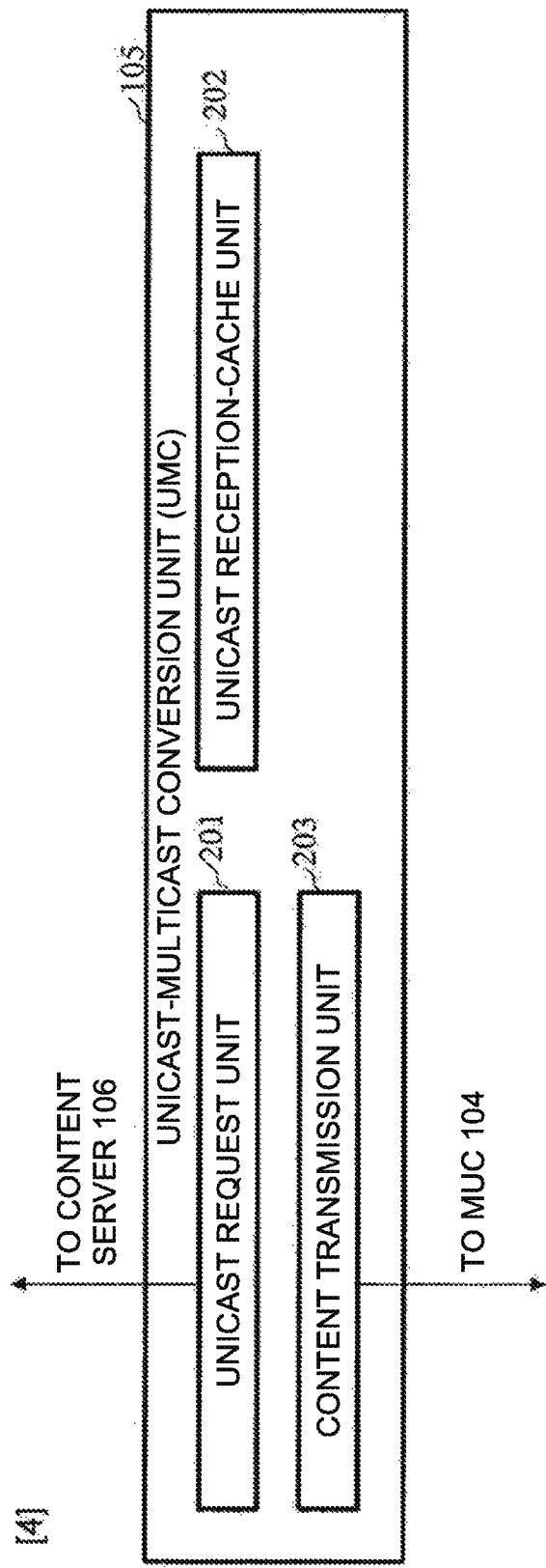
FIG. 4 illustrates exemplary functions of the UMC.

FIG. 4 illustrates functions of the UMC 105 for executing each step in FIG. 2. The UMC 105 includes a unicast request unit 201, a unicast reception-cache unit 202, and a content transmission unit 203.

The content transmission unit 203 reads a content from a cache based on a request from the MUC 104 and transmits the content to the MUC 104. In this case, the MUC 104 selectively transmits the content by both or one of the unicast and multicast communication schemes for each content group. In this manner, the UMC 105 and the MUC 104 cooperate for both or one of unicast communication and multicast communication or selective reception.

For example, the content reception-cache unit 205 included in the MUC 104 includes a mechanism configured to notify the UMC 105 of whether a target multicast signal can be received. Accordingly, the content transmission unit 203 of the UMC 105 can switch unicast communication to multicast communication.

For example, the content reception-cache unit 205 included in the MUC 104 receives both a multicast signal and a unicast signal before a multicast path is established. Before a multicast path is established, the content reception-cache unit 205 generates a cache by the unicast signal. When having received the multicast signal, the content reception-cache unit 205 can determine that a multicast signal can be received.

For example, when only a multicast signal has been transmitted by the UMC 105 and received by the MUC 104 but the MUC 104 has partially failed the reception, the content reception-cache unit 205 determines that a multicast signal cannot be received. In this case, the content request unit 204 specifies a unicast signal and makes a demand on the content transmission unit 203.

When there is no cache corresponding to a request from the content request unit 204, the unicast request unit 201 makes a demand on the content server 106 for a content by unicast communication. For example, the demand uses HTTP, and thus the content server 106 does not need to have a special connection interface for the present system but only needs to perform processing similarly to normal reception of a direct HTTP request from the terminal 107.

The unicast reception-cache unit 202 receives and caches the content transmitted from the content server 106 by unicast communication based on a request from the unicast request unit 201.

Note that the present disclosure assumes that there are a plurality of MUCs 104. When each MUC 104 has no cache, a content is requested to the content server 106 through req. 1, req. 2, and req. 3 and responded to the terminal 107 while caches are produced sequentially through res. 1, res. 2 or M-res. 2, and res. 3.

Since there is a time difference between requests for the same content from terminals, a response to a request delayed from an initial request for the same content from the same MUC 104 is directly returned from the content reception-cache unit 205 thereof. In a case of another MUC 104, when the content is already distributed by multicast or the like, a response is returned similarly from the content reception-cache unit 205 thereof. When the content is yet to be distributed from the UMC 105 in a case of another MUC 104, req. 2 is transferred to the UMC 105, but the UMC 105 waits for the content of the request, and the MUC 104 waits for distribution by multicast or unicast. When the content is already distributed by multicast or the like from the UMC 105 in a case of another MUC 104, reception failure at the other MUC 104 or non-participation of IP multicast to a multicast group is thought to have occurred, and thus res. 2 is returned from the UMC 105 by unicast communication.

Second Embodiment

In the present embodiment, a method of identifying a content group will be described below. The unicast reception-cache unit 202 generates a content group into which a plurality of contents are grouped. In this case, the unicast reception-cache unit 202 generates a content group identifier for identifying the content group into which a plurality of contents are grouped.

For example, the unicast reception-cache unit 202 generates a content group identifier obtained by extracting some of content identifiers such as the disposition place and file name of a content. In this manner, the same content group may have the same identifier.

For example, in HTTP, a uniform resource locator (URL) is used to specify a content. The URL is made of a host name, a path, a file name, a query string, and the like. Assume that one program is made of a plurality of files of the following URLs: http//www.example.org/contents1/streams0001.ts, http//www.example.org/contents1/streams0002.ts, . . . , http//www.example.org/contents1/streamsxxxx.ts In this case, for example, when "www.example.org/contents1" is same, a content is determined as the same program, in other words, the same content group. In this case, "http//www2.example.org/contents1/streams0001.ts" and "http//www.example.org/contents2/streams0001.ts" are identified as other content groups.

The content group identifier obtained by extracting some of those content identifiers does not necessarily need to be known but only needs to be predictable. For example, when "Y-HOST" matches a host name, Z-PATH matches a path, and "X-NUMBER" matches a number in "http//Y-HOST/Z-PATH/streams-X-NUMBER.ts", contents that are same at the part "Y-HOST/Z-PATH" are determined to be in the same content group.

This can be implemented by matching based on a regular expression. In a case in which a group identifier is not a predetermined content group identifier nor a predictable content group identifier, multicast communication may be performed with the group identifier determined as another content group.

For identification as a content group into which a plurality of contents are grouped, a function to list and group a plurality of contents as videos and identify the content group based on a manifest file indicating locations of the contents may be provided.

In a web moving image distribution system, a manifest file is used to handle a plurality of files as one content group and indicate a file to be downloaded. The manifest file may be analyzed to identify, as the same content group, files described in a manifest.

When identification as the same content group is performed based on a content identifier, a content group identifier as a subset of the content identifier needs to be known or predictable, but a content identifier does not need to be known when a content is identified based on a manifest.

A content identifier of a manifest file may be known, but in a web moving image distribution system, the extension of the manifest file is known as, for example, m3u8 or mpd in accordance with a scheme, and thus it may be determined that a file is a manifest file based on the extension, and analysis may be performed.

Third Embodiment

In the present embodiment, details of multicast communication of a content group will be described below. A content group may have a function to control or distinguish a multicast group address, a source address, a port number, and a packet priority and perform multicast communication.

In Internet Group Management Protocol (IGMP) or Multicast Listener Discovery (MLD) of IP multicast, the same multicast group is identified by using a multicast group address as a destination or identified by additionally using a source address as a transmission source.

Thus, in the present disclosure, when IP multicast is used as multicast communication, the same multicast group address or a source address in addition may be allocated to the same content group when communication is performed. A port number and a packet priority may be set and distinguished in addition to determination as the same multicast group as IP multicast.

For example, the Cos value of Ethernet (registered trademark), IP Precedence in the header of an IP packet, or DSCP is used as the packet priority. When the port number is distinguished, a single multicast group of IP multicast can be used in small divisions, and filtering can be easily performed by firewall or the like. The superiority of a content group as service can be determined by distinguishing the packet priority as needed.

Determination of a content group and corresponding transmission and reception by using multicast communication identifiers such as the multicast group address, the source address, the port number, and the packet priority are performed by the MUC 104 and the UMC 105, and some or all of these pieces of information may be centrally managed by the UMC 105 or the like. In this case, the MUC 104 may perform management query at execution of steps S1 and S4, and the UMC 105 may perform management query at steps S2 and S3.

Fourth Embodiment

A system of the present embodiment has a function to discriminate a multicast target content and a non-target content.

The content request unit 204 of the MUC 104 has a function to determine whether a content is a content for multicast and make a demand on the UMC 105 or the content server 106 for the content by unicast communication when the content is not for multicast. The content transmission unit 203 of the UMC 105 has a function to transmit a content by unicast when having received a unicast request from the MUC 104. A content that uses multicast communication as well as a content that uses the MUC 104 or the UMC 105 as a typical web proxy system may be present.

When multicast communication is used, processing of identifying a content group and setting different multicast communication for each content group needs to be performed, but in web proxy, beforehand simple bifurcation of processing is typically possible by using an extension or the like. For example, an extension other than a moving image can be directly processed as a web proxy system without advance to a step of performing processing and determination using multicast communication. Accordingly, the system of the present disclosure can simplify multicasting processing and also can receive an HTTP request other than a multicasting target such as a moving image and thus can be used as general-purpose proxy.

Fifth Embodiment

A system of the present embodiment has a multicast dynamic join/leave function. When a content is a content for multicast, the content request unit 204 of the MUC 104 determines whether the content participates in a multicast group corresponding to a content group. In a case of non-participation, the content request unit 204 sends a participation signal. When, for a constant time, there is no demand for a content of the content group corresponding to the multicast group in which the content participates, the content request unit 204 sends a signal for leaving from the multicast group.

In IP multicast, registration to a router of the multicast group is needed. According to the present embodiment, in addition to static participation registration, participation registration and participation leave of a multicast route can be dynamically performed each time target multicast communication occurs. For example, IGMP or MLD can be used as a mechanism of the dynamic participation registration and participation leave.

With the dynamic participation registration and participation leave, it is possible not to perform multicast communication of a content group that is not viewed among a plurality of MUCs 104, and thus it is possible to reduce unnecessary traffic. When the number of registered multicast groups is limited, it is possible to reduce the number of registered multicast groups. Note that it may be based on static setting of a multicast group to the router.

Sixth Embodiment

A system of the present embodiment performs unicast communication before multicast join. In the multicast communication network 102, after an MUC 104 sends a participation signal and a multicast route to the MUC 104 is established, content distribution to the MUC 104 by using multicast communication becomes possible. The present disclosure can support such a multicast dynamic participation-leave function of the MUC 104.

Specifically, before a multicast route is established after the participation signal is sent, the content request unit 204 makes a demand on the UMC 105 for a content by unicast communication. In this case, the content reception-cache unit 205 receives and caches the content from the UMC 105 by unicast communication. When having received a unicast request from the MUC 104, the content transmission unit 203 included in the UMC 105 transmits a content by unicast.

This enables content transmission and reception from the UMC 105 to the MUC 104 for duration of propagation and a set time as well when a multicast group is dynamically set to the router. In this case, the MUC 104 can explicitly instruct, by req. 2, that multicast is unnecessary. The UMC 105 having received this message always responds res. 2 of unicast communication.

The UMC 105 may respond M-res. 2 of multicast communication as well. In this case, the UMC 104 generates a cache by receiving res. 2 before arrival of M-res. 2.

Completion of dynamic participation registration of the multicast group to the router may be set by a timer as a simple manner. After elapse of time set by a set timer, it can be assumed that the multicast group is registered to the router, and operation can be performed for expectation of multicast communication.

The UMC 105 may simultaneously transmit res. 2 and M-res. 2 as described above. The MUC 104 may determine, based on reception of M-res. 2, that dynamic participation registration of the multicast group to the router is completed.

After the MUC 104 determines that multicast communication is possible based on completion of registration to the multicast group or the like, only M-res. 2 of multicast communication can be demanded by res. 2.

Seventh Embodiment

A system of the present embodiment has an FEC function of multicast communication. The content transmission unit 203 of the UMC 105 may have, as a multicast transmission function, a function to add forward error correction (FEC) information and perform multicast transmission. In this case, the content reception-cache unit 205 of the MUC 104 has a function to correct a multicast signal from the UMC 105, to which the FEC information is added, based on the FEC information.

Communication by IP multicast is one-to-many communication and cannot perform individual error correction of an automatic repeat request (ARQ) or the like. Thus, certain redundant data may be added as the FEC information to compensate data defect due to a packet loss in a transmission path, packet reception failure by a receiver, or the like. Accordingly, stable communication can be performed even when a transmission path is unstable so that a packet loss is likely to occur or when stable packet reception cannot be performed by a receiver.

The FEC used in multicast communication may employ the following configuration. For example, content information to which the FEC is yet to be added and the added FEC information are multicast-transmitted as different packets. In this case, some or all of the multicast group address, the source address, the port number, and the packet priority are different between the packet of the content information to which the FEC information is yet to be added and the packet of the added FEC information.

The FEC increases, in accordance with the strength thereof, redundant data by 10% or 20% approximately of data to which the FEC information is yet to be added. This may be set to the same content group as the original data or may be set to another content group. This facilitates separation of processing and enables easy execution of monitoring and filtering in a network.

A total network band needs to be designed for a packet of a high priority, in particular. Thus, only the priority of the original data may be set to be high and the priority of the FEC information may be relatively lowered, or only the priority of the FEC information may be set to be high and the priority of the original data may be relatively lowered. Accordingly, a finite high-priority packet can be efficiently used.

Eighth Embodiment

A system of the present embodiment has an ARQ function of multicast communication. The content request unit 204 of the MUC 104 has an ARQ unicast request function, and the content reception-cache unit 205 has an ARQ unicast reception cache function. The content transmission unit 203 of the UMC 105 has a unicast transmission function.

The ARQ unicast request function is a function to transmit a unicast request that a content is demanded by using unicast communication when there is a loss in a multicast signal received from the UMC 105. The ARQ unicast reception cache function is a function to receive a content from the UMC 105 by using unicast communication and cache the content in the content reception-cache unit 205. The content transmission unit 203 of the UMC 105 may have a function to transmit a content by unicast when having received the unicast request from the MUC 104.

When reception of M-res. 2 is waited at the MUC 104 and a reception signal thereof is not completed, for example, a packet loss or reception failure at the MUC 104 is thought as a cause, and as a result, the signal is lost at the MUC 104. In this case, the MUC 104 can compensate the loss by reissuing req. 2 only by unicast communication. This is the automatic repeat request (ARQ) in units of files. The ARQ in units of files can be easily implemented as compared to the ARQ in units of packets or in units of blocks because an HTTP request mechanism can be used.

This is a scheme that is possible because the present disclosure performs HTTP-based file-based multicasting unlike another multicast system. In some cases, a moving image file is divided into files obtained by partitioning the playback time thereof into several seconds approximately. In such a case, sufficient efficiency is maintained with retransmission processing in units of files.

The present embodiment may make a divided demand in the ARQ of multicast communication. For example, the content request unit 204 of the MUC 104 has a function to demand for part of a content. In this case, the content reception-cache unit 205 has a multicast-unicast mixed reception-cache function to receive, from the UMC 105, a content divided into unicast communication and multicast communication and restore and cache the original content. When having received a unicast request for part of a content from the MUC 104, the content transmission unit 203 included in the UMC 105 transmits the content by unicast.

The content request unit 204 is not limited to units of files but the ARQ is possible in units of packets or in units of blocks obtained by dividing a content into a plurality of blocks. In this case, use of the HTTP request req. 2 is inappropriate from a viewpoint of overhead. Thus, the content request unit 204 preferably uses an ARQ message, not req. 2.

The content request unit 204 may perform the ARQ using a negative-acknowledgement (NACK) message. This scheme is excellent in response fastness and band efficiency as compared to the ARQ in units of files.

The system of the present embodiment may perform the ARQ in units of packets or in units of blocks. In this case, order numbers are allocated to packets with which the ARQ is performed or blocks included in a content, and determination of the existence of a lack and redemanding are performed based on the order numbers. The ARQ in units of files may be used together with the ARQ in units of packets or in units of blocks.

Ninth Embodiment

A system of the present embodiment includes a plurality of UMCs 105, all or some of the plurality of UMCs 105 operate as a regular-use system, and when failure or overload occurs to the UMCs 105 of the regular-use system, functions of all or some of the UMCs 105 of the regular-use system are achieved by UMCs 105 of another regular-use system or a non-regular-use system instead.

Figure 5:
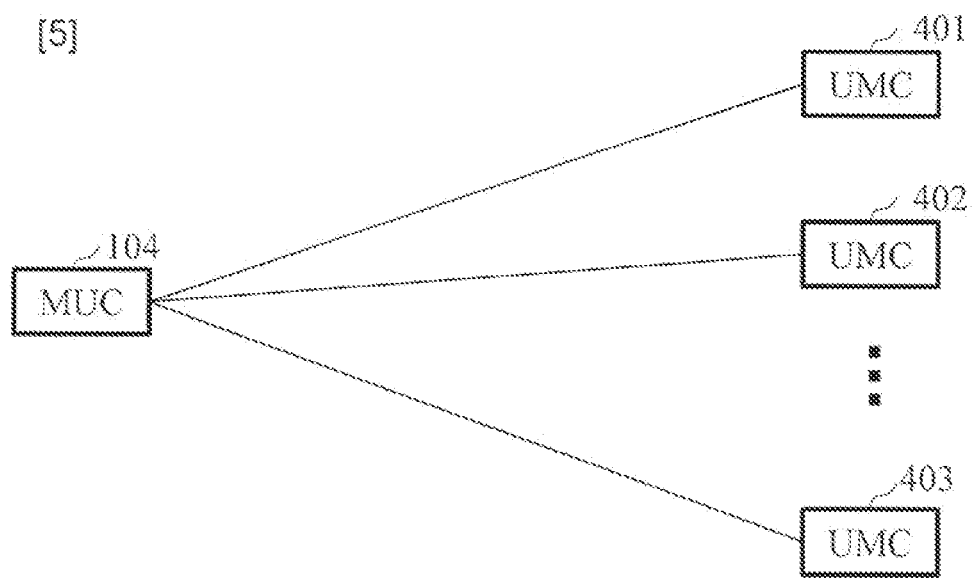
FIG. 5 is a schematic configuration diagram of a system according to a ninth embodiment.

FIG. 5 illustrates a configuration when there are a plurality of UMCs 105. A plurality of UMCs corresponding to the UMCs 105 are 401, 402, and 403. In a case in which the UMCs 401 and 402 are a regular-use system and the UMC 403 is a non-regular-use system, all or some functions of the UMC 401 can be taken over by the UMC 403 when failure or overload occurs to the UMC 401.

The UMC 401 and the UMC 402 are a load distribution system, and for example, connection destinations of the MUC 104 to the UMCs 401 and 402 can be changed for each content group.

The regular-use system can perform degeneracy operation at failure. For example, when failure occurs to the UMC 401, the UMC 402 can take charge of functions of the UMC 401 and functions of which the UMC 402 is in charge before the failure of the UMC 401. For example, when the UMC 402 is overloaded, the UMC 402 can take charge of some content-group processing functions of which the UMC 401 is in charge and functions of which the UMC 402 is in charge before the overload of the UMC 401.

Such a function not only makes it possible to improve the system operation rate but also makes it possible to perform migration without service interruption in system replacement and extension.

Tenth Embodiment

A system of the present embodiment includes a two or plurality of MUCs 104, and when an MUC 104 having received a request from the terminal 107 is overloaded, a signal for redirect to a different MUC 104 is transmitted to the terminal 107, and the terminal 107 having received the redirect transmits a request to the MUC 104 again based on the redirect.

Figure 6:
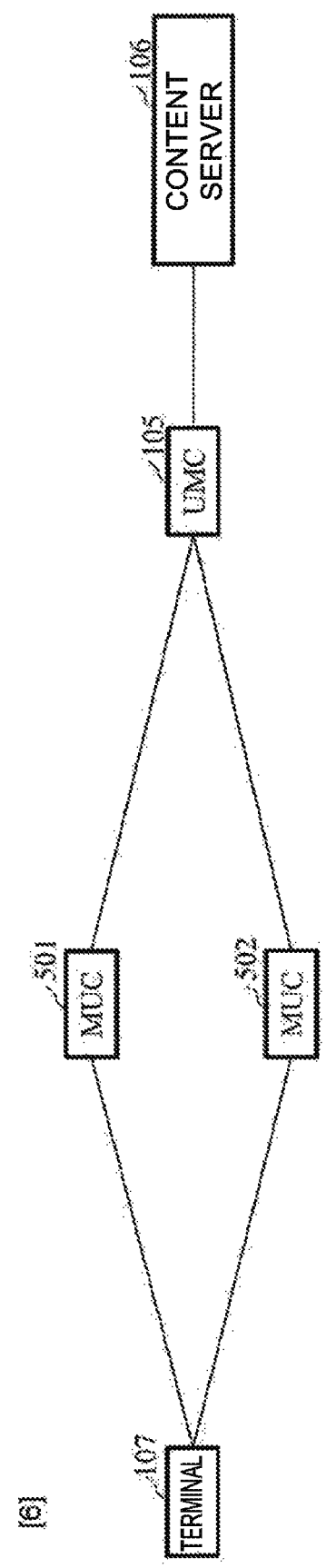
FIG. 6 is a schematic configuration diagram of a system according to a tenth embodiment.
Figure 7:
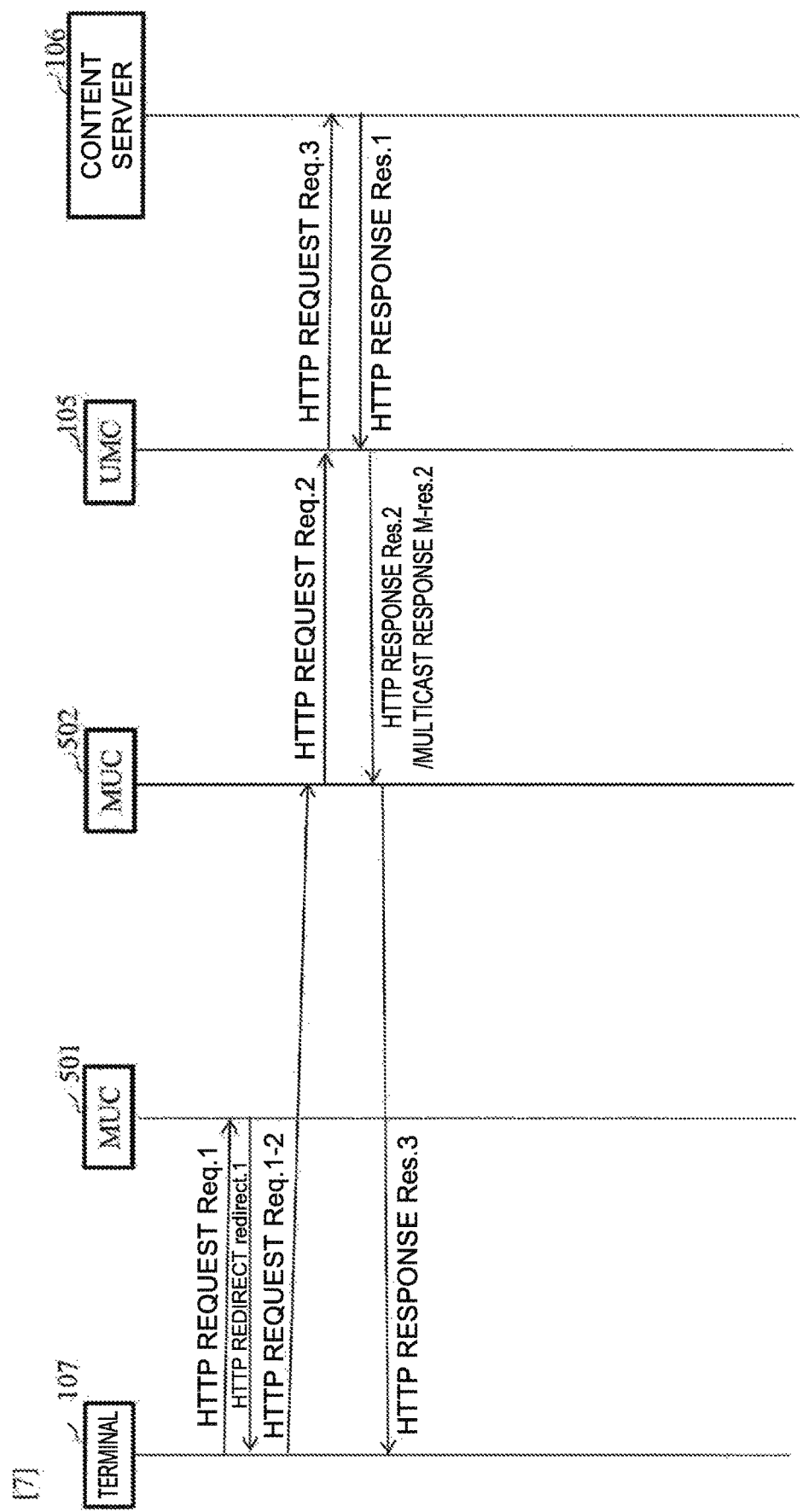
FIG. 7 illustrates a sequence of the tenth embodiment when the MUC and the UMC have no cache.

FIG. 6 illustrates an exemplary configuration when there are a plurality of MUCs 104. FIG. 7 illustrates a sequence when MUCs and a UMC have no cache. A plurality of MUCs corresponding to the MUCs 104 are 501 and 502. The MUC 501 is connected with a particular terminal 107 at normal operation, and when the MUC 501 is overloaded, the MUC 501 can transmit an HTTP redirect redirect. 1 to the MUC 502 in response to an HTTP request req. 1 from the terminal 107.

Redirect includes permanent redirect and temporary redirect. The MUC 104 performs permanent redirect when the MUC 501 cannot respond for a while or when facility relocation from the MUC 501 is necessary, or performs temporary redirect otherwise. The present embodiment can use temporary redirect or permanent redirect by performing, for the terminal 107, specification not to cache a file. Note that, when used by performing the specification not to cache a previous term file, permanent redirect can be used for temporary redirect.

When the content reception-cache unit of the MUC 502 has no cache after redirect from the MUC 501, the content request unit of the MUC 502 transmits a request to the UMC 105. In the present embodiment, after the request is forwarded from the UMC 105 to the content server 106, a response is stored in the content reception-cache unit of the MUC 502 through the UMC 105. Accordingly, the terminal 107 receives the response by res. 3. Accordingly, peak dispersion is possible for the MUC on which loads from a plurality of terminals 107 are likely to be concentrated, and investment in facilities to the MUC can be reduced.

Eleventh Embodiment

In the system of FIG. 1, the MUC 104 having received a request from the terminal 107 is overloaded in some cases. A system of the present embodiment disperses a load on the MUC 104 by performing redirect to the UMC 105 in place of the MUC 104.

At the overload, the unicast transmission unit 206 of the MUC 104 of the present embodiment transmits a message of redirect to the UMC 105 to the terminal 107 having transmitted the request. The terminal 107 transmits a request to the UMC 105 based on the redirect message. When having received the request from the terminal 107, the unicast transmission unit 206 of the UMC 105 transmits a content to the terminal 107 by unicast.

Figure 8:
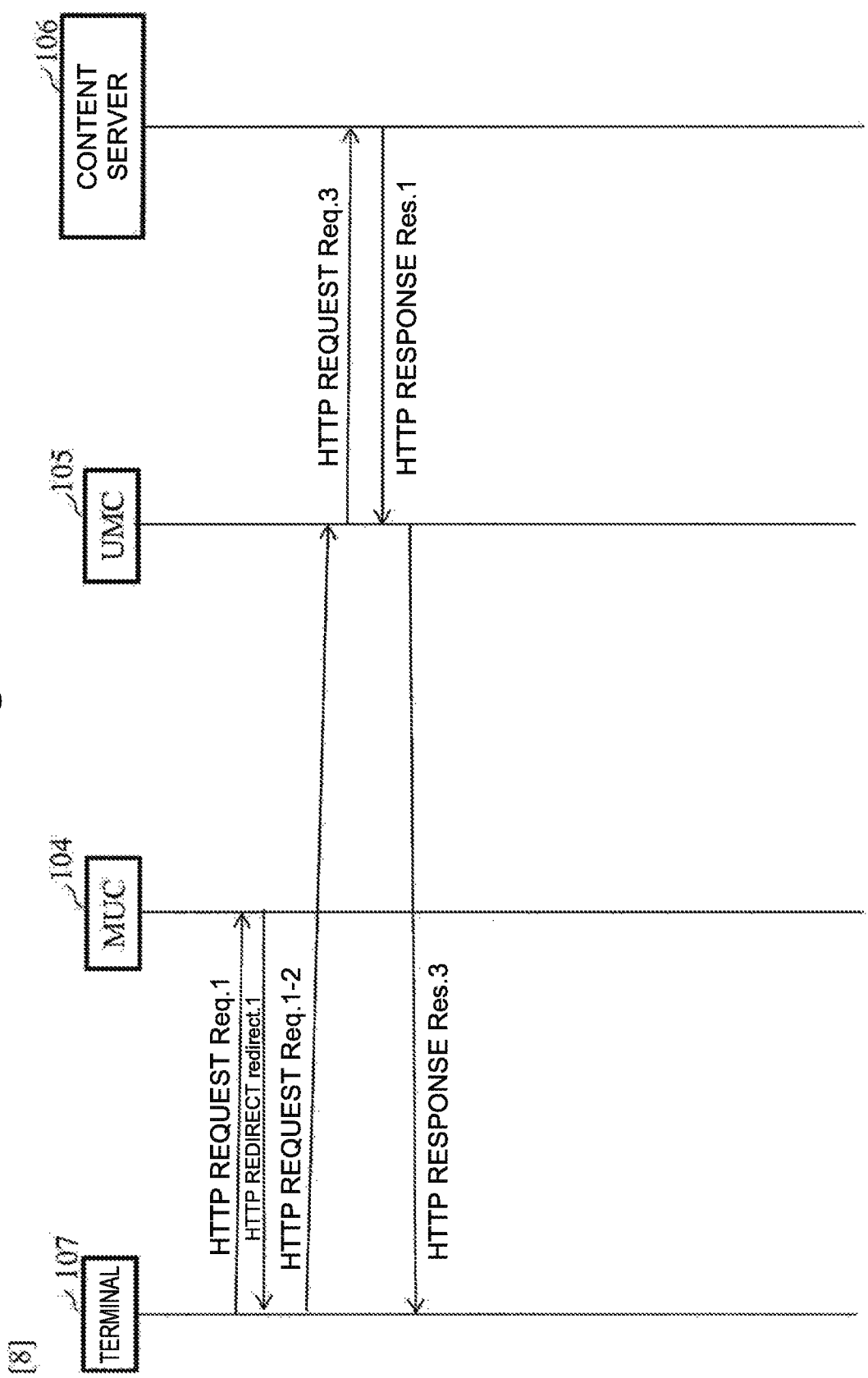
FIG. 8 illustrates a sequence of an eleventh embodiment when the MUC and the UMC have no cache.

FIG. 8 illustrates a sequence when MUCs and a UMC have no cache. The MUC 104 is connected with a particular terminal 107 at normal operation, and when overloaded, the MUC 104 transmits an HTTP redirect redirect. 1 to the UMC 105 in response to an HTTP request req. 1 from the terminal 107.

Having received the request from the terminal 107, the UMC 105 checks whether a content is stored in the unicast reception-cache unit 202. When the content is not stored in the unicast reception-cache unit 202, the content is acquired from the content server 106 by unicast and stored in the unicast reception-cache unit 202. Then, the content transmission unit 203 transmits the content to the terminal 107 by unicast.

Redirect includes permanent redirect and temporary redirect. The MUC 104 performs permanent redirect when the MUC 104 cannot respond for a while or when facility relocation from the MUC 104 is necessary, or performs temporary redirect otherwise. The present embodiment can use temporary redirect or permanent redirect by performing, for the terminal 107, specification not to cache a file. Note that, when used by performing the specification not to cache a previous term file, permanent redirect can be used for temporary redirect.

When the unicast reception-cache unit 202 of the UMC 105 has no cache after redirect, the unicast request unit 201 of the UMC 105 transmits a request to the content server 106, and the unicast reception-cache unit 202 of the UMC 105 receives a response res. 1 from the content server 106 and stores the content. In this manner, the content from the content server 106 is responded to the terminal 107 by res. 3 through the UMC 105 by using unicast communication. Accordingly, peak dispersion is possible for the MUC 104 on which loads from a plurality of terminals 107 are likely to be concentrated, and investment in facilities to the MUC 104 can be reduced.

Note that, as for the terminal 107, conversion into multicast is not performed, and operation is substantially equivalent to normal web-proxy operation. Load dispersion to MUCs 104 and load dispersion form an MUC 104 to the UMC 105 may be both used. The load dispersions may be selectively used depending on the network distance from the terminal 107 and the congestion status of a midstream network.

Twelfth Embodiment

The unicast reception-cache unit 202 included in the UMC 105 may store a content as divisions. In this case, the content transmission unit 203 included in the UMC 105 has a function to transmit divided caches to the MUC 104 by multicast or unicast. In the MUC 104, the divided caches are stored in the content reception-cache unit 205, and the unicast transmission unit 206 restores the content from the divided caches and transmits the content to the terminal 107 by unicast.

In HTTP, a file is the basic unit of forwarding, and delay increases when multicast communication is started after the UMC 105 completely acquires a file from the content server 106 by the HTTP response res. 1. The delay can be concealed by dividing and caching one file at a timing when the UMC 105 starts content acquisition by res. 1 and starting multicast communication of M-res. 2.

In addition, in the MUC 104, the unicast transmission unit 206 may start unicast transmission to the terminal 107 at a timing when the content reception-cache unit 205 completes reception of one or more divided caches.

In HTTP, a file is the basic unit of forwarding. Thus, delay increases when communication of the HTTP response res. 3 from the MUC 104 to the terminal 107 is started after the MUC 104 completely acquires a file from the UMC 105. Thus, it is preferable that, at a timing when the content reception-cache unit 205 included in the MUC 104 starts content acquisition, one file is divided and cached in the content reception-cache unit 205 and the unicast transmission unit 206 starts res. 3. Accordingly, the present embodiment can conceal delay in the multicast communication network 102.

The content reception-cache unit 205 included in the MUC 104 and the unicast reception-cache unit 202 included in the UMC 105 may have a plurality of data storage regions in which a content is cached. In this case, the content reception-cache unit 205 and the unicast reception-cache unit 202 may have a function to move a cache file between the data storage regions in accordance with the use frequency and access time of a content, the cache use amount of a content group, and settings of the content or the content group.

At the MUC 104 connected with a large number of terminals 107, and the UMC 105 configured to provide a content to a plurality of MUCs 104 and terminals 107, the speed of cache reading and writing affects a response speed and a load. As the speed of cache reading and writing is faster, a large number of terminals 107 and the like are more likely to be accommodated. Such a cache is desirably placed on a memory. However, since the size of a cache on a memory is limited, it is desirable to have a larger number of caches for improvement of distribution efficiency with a cache.

Thus, two requirements of speed and capacity can be satisfied by allocating a primary cache on a memory and a secondary cache on a disk. Movement from the primary cache to the secondary cache may be performed in accordance with the use frequency and access time of a content, the cache use amount of a content group, and settings of the content or the content group.

In cache movement in accordance with the use frequency of a content, for example, a table of the number of times of use is held for each content, and cache-out to the secondary cache is controlled in accordance with the number of times of use. In cache movement in accordance with the access time, for example, cache-out to the secondary cache is performed by a timer based on the last access time. In cache movement in accordance with the cache use amount of a content group, for example, a maximum cache amount is limited for a particular single content group or a plurality of content groups. Cache-out in a content group to which the same control policy is applied is controlled based on the above-described use frequency and access time of a content and the like. These settings may be performed for an individual content or content group.

Thirteenth Embodiment

In the present embodiment, the unicast reception-cache unit 202 included in the UMC 105 receives a content from a content server 107 not based on a request from the MUC 104. For example, a content is push-distributed from the content server 106 to the UMC 105. The unicast reception-cache unit 202 included in the UMC 105 generates a cache from the received content and stores the cache. Then, the content transmission unit 203 included in the UMC 105 transmits the content by using multicast communication or unicast communication for each content group.

In a system described so far, since a request and a response are relayed upon the HTTP request req. 1 from the terminal 107, distribution delay accumulates in some cases. In a web moving image distribution system, as adaptive bitrate (ABR), it is typical that files of image qualities at a plurality of levels are prepared and the image quality of a file to be downloaded is actively selected by a player at the terminal 107. When distribution delay is accumulated, bands of a network are sufficient, but switching is potentially made to a video of low image quality because of delay. Thus, a cache can be produced in the MUC 104 before a request from the terminal 107 is performed, by push-transmitting a content file from the content server 106 to the UMC 105 and push-transmitting the content file from the UMC 105 to the MUC 104 by multicast or unicast. Accordingly, a content can be transmitted to the terminal 107 in a shortest response time, thereby achieving stable distribution at high image quality.

Fourteenth Embodiment

The content request unit 204 included in the MUC 104 or the unicast request unit 201 included in the UMC 105 may have a function to request a content of a content group not based on a request from the terminal 107.

The above-described push from the content server 106 needs extension of functions of a normal web server. Thus, the MUC 104 or the UMC 105 may request a known content not based on a request from the terminal 107 but independently.

Figure 9:
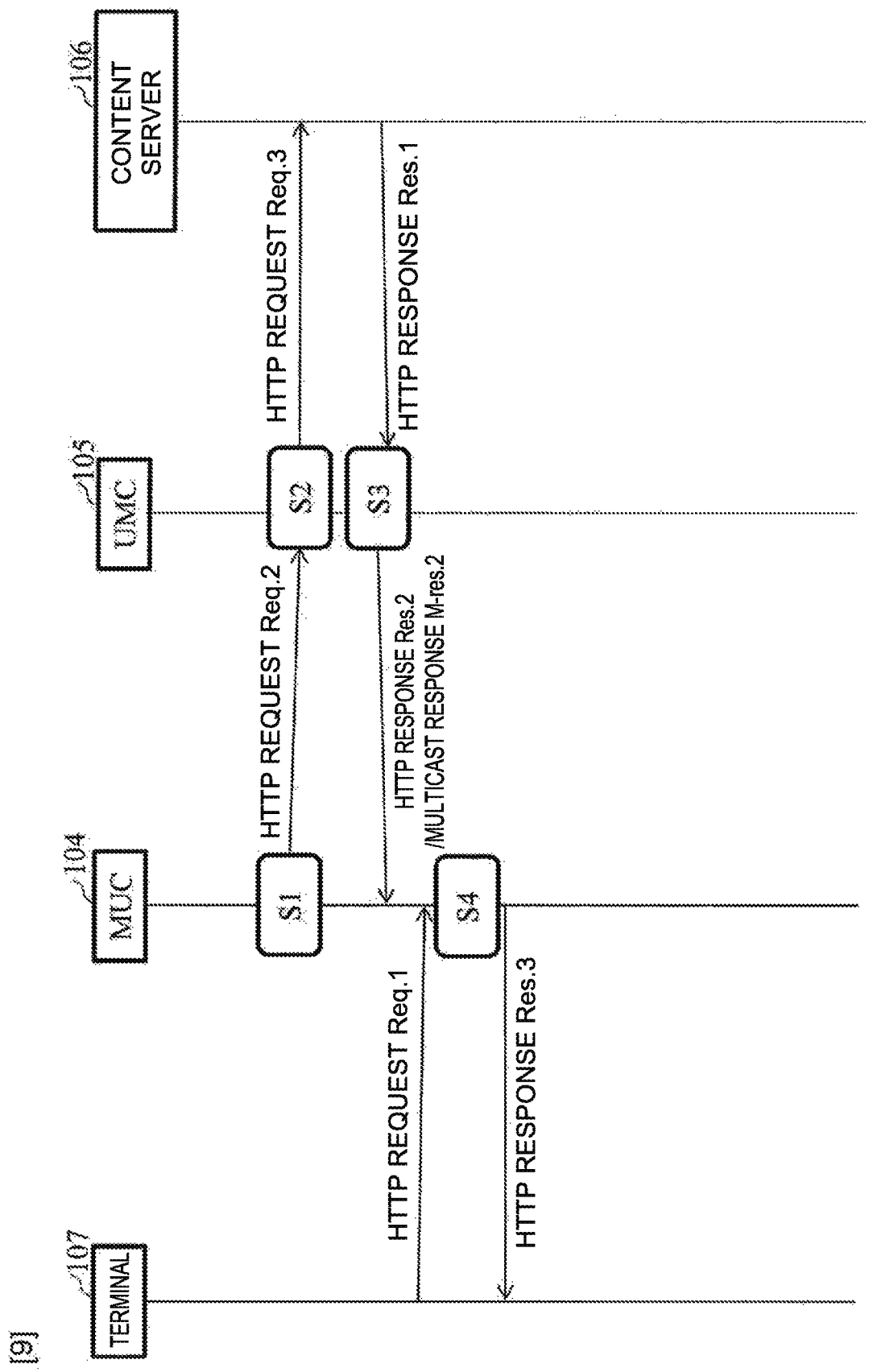
FIG. 9 illustrates a first example of a sequence of a fourteenth embodiment.

For example, as illustrated in FIG. 9, the HTTP request req. 2 is independently generated at step S1 in some cases. Note that FIG. 9 illustrates a case in which there is no cache at the start of a sequence. At step S2, the UMC 105 having received the HTTP request req. 2 determines that there is no cache corresponding to the HTTP request req. 2 from the MUC 104, and forwards the HTTP request req. 3 to the content server 106.

The content server 106 responds the content file corresponding to req. 3 to the UMC 105 by the HTTP response res. 1. Having received res. 1, the UMC 105 executes step S3. At step S3, the UMC 105 generates a cache file by using the content file included in res. 1 and responds the cache file to the MUC 104. The response from the UMC 105 to the MUC 104 is the response corresponding to the HTTP request req. 2 and may be the HTTP response res. 2, the multicast response M-res. 2, or both res. 2 and M-res2.

Having received res. 2 or M-res2, the MUC 104 stores the cache file included in res. 2 or M-res. 2.

Subsequently, the HTTP request req. 1 from the terminal 107 is transmitted to the MUC 104. Having received req. 1, the MUC 104 executes step S4. At step S4, the MUC 104 determines that there is a cache corresponding to the HTTP request req. 1 from the terminal 107, and responds the stored cache file as the HTTP response res. 3. The response res. 3 is a response to the terminal 107, which corresponds to the HTTP request req. 1. Note that caches at the MUC 104 and the UMC 105 are deleted at appropriate timings due to restriction on the storage capacity of a disk or the like or distribution policy.

Note that res. 1 does not necessarily need to be generated after cache production by res. 2 or M-res2. This is because a time until cache generation can be reduced when res. 1 is generated after req. 2.

Figure 10:
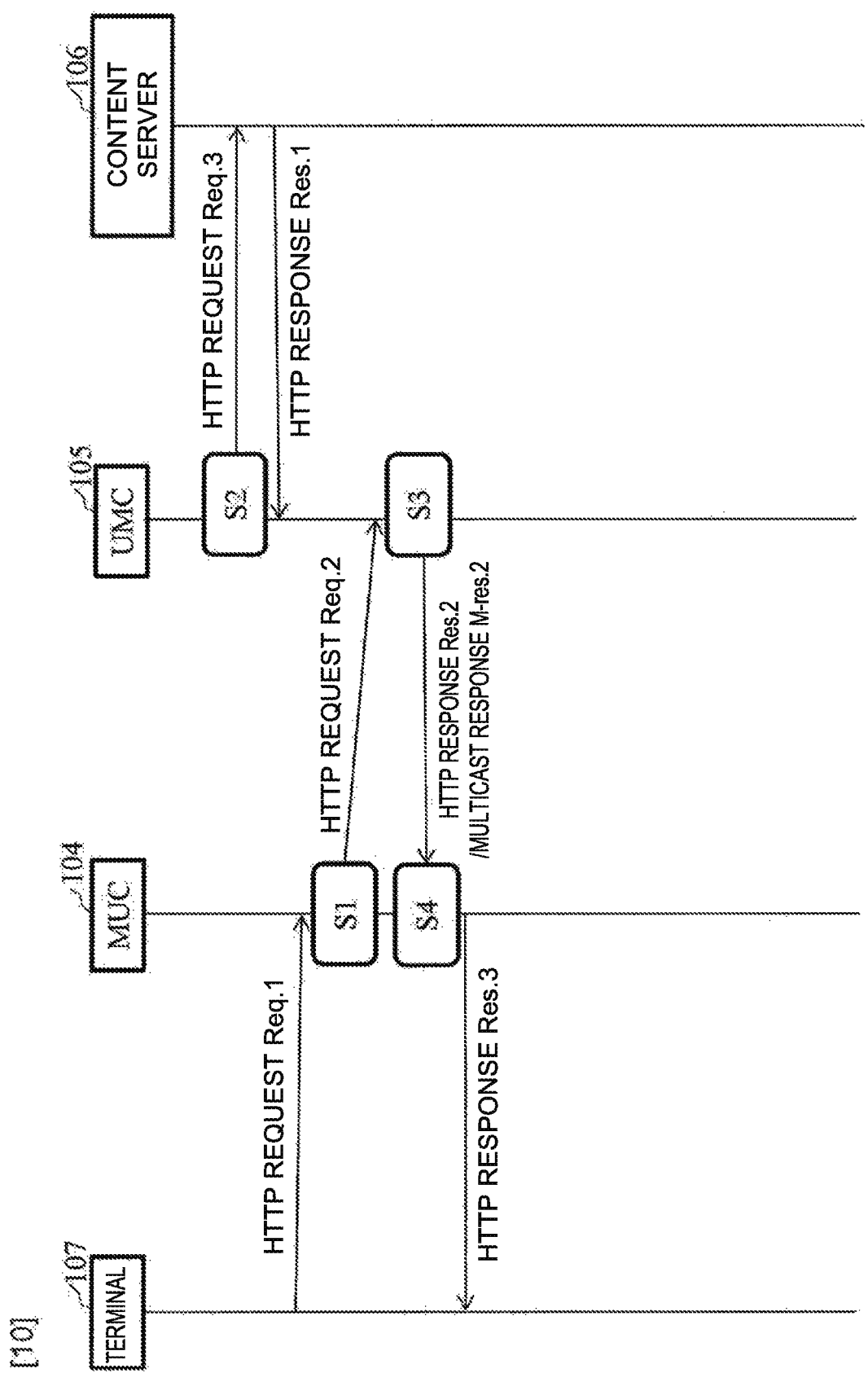
FIG. 10 illustrates a second example of the sequence of the fourteenth embodiment.

For example, the HTTP request req. 3 is independently generated at step S2 in some cases as illustrated in FIG. 10. Note that FIG. 10 illustrates a case in which there is no cache at the start of a sequence.

Having received the HTTP request req. 3, the content server 106 responses the content file corresponding to req. 3 to the UMC 105 by the HTTP response res. 1, and the UMC 105 generates a cache file by using the content file included in res. 1.

Subsequently, the HTTP request req. 1 from the terminal 107 is transmitted to the MUC 104. Having received req. 1, the MUC 104 executes step S1. At step S1, the MUC 104 determines that there is no cache corresponding to the HTTP request req. 1 from the terminal 107, and forwards the HTTP request req. 2 to the UMC 105 as a higher-level proxy server.

Having received res. 2, the UMC 105 executes step S3. At step S3, the UMC 105 determines that there is a cache corresponding to the HTTP request req. 2 from the MUC 104, and responds the cache file to the UMC 104. The response from the UMC 105 to the MUC 104 is the response corresponding to the HTTP request req. 2 and may be the HTTP response res. 2, the multicast response M-res. 2, or both res. 2 and M-res2.

Having received res. 2 or M-res2, the MUC 104 executes step S4. At step S4, the MUC 104 stores the cache file included in res. 2 or M-res. 2. The MUC 104 responds the stored cache file by the HTTP response res. 3. The response res. 3 is a response to the terminal 107, which corresponds to the HTTP request req. 1. Note that caches at the MUC 104 and the UMC 105 are deleted at appropriate timings due to restriction on the storage capacity of a disk or the like or distribution policy.

Note that res. 1 does not necessarily need to be generated after cache production by res. 3. This is because a time until cache generation can be reduced when res. 1 is generated after req. 3.

Accordingly, a content can be transmitted to the terminal 107 in a shortest response time without special extension of the content server 106, thereby achieving stable distribution at high image quality.

When the MUC 104 or the UMC 105 requests a content not based on a request from the terminal 107, the content request unit 204 included in the MUC 104 or the unicast request unit 201 included in the UMC 105 may be characterized by identifying, setting, and predicting the time of content generation at the content server 106 and performing synchronization with the content generation time.

In a case of a static content, there is a known URL for the content, a request by the MUC 104 or the UMC 105 can be generated not based on a request from the terminal 107. For a future content such as a live, request generation cannot be performed with static settings in some cases. Thus, the content request unit 204 or the unicast request unit 201 may analyze a manifest file to generate a request for a content predicted to be generated in near future from the latest content described in the manifest file or a rule described in the manifest file. Accordingly, in live or linear video distribution as well, a content can be transmitted to the terminal 107 in a shortest response time without special extension of a content server, thereby achieving stable distribution at high image quality.

In a case of a content group in which contents has temporal orders, the content request unit 204 or the unicast request unit 201 may have a function to request a content before or after a content requested from the terminal 107.

When playback of a particular content is started, an operator of the terminal 107 operates a playback bar on the terminal 107 to temporally discontinuously perform playback forward or backward instead of a temporal order at the playback start in some cases. In such a case, the MUC 104 or the UMC 105 may request a file of a time in the vicinity of a playback time or a file statistically having a high playback frequency to achieve stable distribution at high image quality.

Fifteenth Embodiment

Unused combinations of multicast communication identifiers such as the multicast group address, the source address, and the port number, which can be used for multicast communication may be stored, a stored unused combination of multicast communication identifiers may be allocated each time communication of a content of a new content group based on a request from the terminal 107 occurs, and the multicast communication identifiers may be stopped using when not used for a certain time and may be stored as a unused combination of multicast communication identifiers again.

Address management and distribution source may be performed by the UMC 105 or another management server. Address distribution destinations are the content transmission unit 203 in the UMC 105 and the content reception-cache unit 205 in the MUC 104.

FIGS. 11 and 12 illustrate table arrangement when the UMC 105 has tables of available multicast communication identifiers such as the multicast group address, the source address, and the port number. A table 801 is an available multicast communication identifier table, a table 802 is a table storing multicast communication identifiers at multicast communication by the content transmission unit 203, and a table 803 is a table storing multicast identifiers at multicast reception by the content reception-cache unit 205.

When starting transmission of multicast communication, the content transmission unit 203 refers to the table 802, and when there is no multicast identifier corresponding to a target content group, the content transmission unit 203 acquires the multicast identifier from the table 801 and registers the multicast identifier in the table 802. Similarly, when starting reception of multicast communication, the content reception-cache unit 205 refers to the table 803, and when there is no multicast identifier corresponding to a target content group, the content reception-cache unit 205 acquires the multicast identifier from the table 801 and registers the multicast identifier in the table 803. The table 801 exports each multicast identifier and then writes, to the table, a flag for use by the content group for which the export is performed.

FIG. 13 illustrates a table image held by the table 801. It is indicated that a multicast identifier IDM2 is exported for a content group IDG1, a multicast identifier IDM3 is exported for a content group IDG2, and both are used by the MUC 104 and the other multicast identifiers are not used.

Note that the table 803 is a subset of the table 802, and thus a multicast identifier may be acquired from the table 802, not from the table 801. In this case, using MUCs in the table 801 may be managed in the table 802.

Note that the table illustrated in FIG. 13 is schematically expressed, and hash may be used to save memory and facilitate table search or implementation may be performed in another form such as a data structure of a list.

FIG. 14 illustrates an example of the table 802 and the table 803. It is indicated that the multicast identifier IDM2 is used for the content group IDG1, the multicast identifier IDM3 is used for the content group IDG2, and the other part of the table indicates availability.

Note that the table illustrated in FIG. 14 is schematically expressed, and hash may be used to save memory and facilitate table search or implementation may be performed in another form such as a data structure of a list. The table 802 is a subset of the table 801, and the tables may be managed as a single table when implemented for the same functional component.

In the MUC 104, when a content is not used, this use stop may be determined by using a timer or the like, a corresponding content group and a multicast identifier may be deleted in the table 803, and the MUC may deleted from among using MUCs in the table 801 or the table 802. When there is no using MUC, it is determined that there is no MUC performing multicast reception, and thus the target content group in the column of using content group in the table 801 and the row of the target content group in the table 802 are deleted. This operation makes it possible to reuse the multicast identifier.

Sixteenth Embodiment

A configuration with which the same IP address can be allocated to a plurality of MUCs 104 and a request to a nearest MUC 104 can be transmitted from the terminal 107 without distinction of the plurality of MUCs 104 may be employed.

A reception interface of each MUC 104 for a request from the terminal 107 may be guided, by using IP any-cast routing, for access to an MUC nearest to the terminal 107. Accordingly, management can be made easy as compared to management by another scheme such as DNS. In addition, attack on the request reception interface of the MUC 104 is dispersed, and robustness against attack can be achieved.

Seventeenth Embodiment

A content location position described in a manifest file may be changed from the content server 106 to the MUC 104 and a request from the terminal 107 to the MUC 104 may be performed.

In a web moving image distribution system, an actual condition file name of moving image data called a manifest, and a file indicating the place of a file are read at initial reading of a moving image. The destination of the HTTP request req. 1 from the terminal 107 can be changed to the MUC 104 by changing the file place of the moving image data in this manifest file to the MUC 104.

Since the manifest file is transmitted to the terminal 107 by HTTP request and response, the manifest file in a viewing environment of the terminal 107 can be easily individually transmitted to the terminal 107 based on a terminal IP address by the content server 106 and information, such as header information of an HTTP request and query string information of the HTTP request, which can be acquired from the HTTP request and depends on the terminal 107 or can be added by the terminal 107.

Accordingly, the present embodiment can perform flexible distribution control as compared to sorting by DNS and can complete control contained for a web system, which facilitates system establishment. The request destination change by manifest file rewriting may be combined with another request destination changing method.

The manifest file may be rewritten at the content server 106 in which the manifest file before rewriting is stored, but another rewriting server may be used. Accordingly, a request from the terminal 107 to the MUC 104 can be achieved without direct knowledge of the position of the MUC 104 by the content server 106. This is effective when the content server 106 and an administrator of the MUC 104 are different from each other, and can be achieved when the administrator of the MUC 104 manages a manifest file rewriting server.

Eighteenth Embodiment

A request from the terminal 107 to the content server 106 may be redirected to the MUC 104 by the content server 106 to perform a request from the terminal 107 to the MUC 104.

The content server 106 may perform determination based on a terminal IP address and information, such as header information of an HTTP request and query string information of the HTTP request, which can be acquired from the HTTP request and depends on the terminal 107 or can be added by the terminal 107, and HTTP redirect may be performed for the terminal 107 to access the MUC 104.

A redirect message includes permanent redirect and temporary redirect, and the present embodiment can use temporary redirect or permanent redirect by performing, for the terminal 107, specification not to cache a file. Note that, when used by performing the specification not to cache a previous term file, permanent redirect can be used for temporary redirect. Accordingly, access from the terminal 107 to the MUC 104 can be achieved while a content itself is not rewritten and a primary request from the terminal 107 is collected to the content server 106. This request destination change by redirect may be combined with another request destination changing method.

Nineteenth Embodiment

In the present embodiment, the system illustrated in FIG. 1 further includes a forwarding unit (not illustrated) configured to forward a request for a content or a content group. In the present embodiment, a request from the terminal 107 to the content server 106 is redirected to the forwarding unit by the content server 106, and a request from the terminal 107 to the forwarding unit is redirected to the MUC 104 by the forwarding unit. Accordingly, in the present embodiment, a request from the terminal 107 to the MUC 104 is performed. In other words, the content server 106 performs first redirect to another server as the forwarding unit, and then the forwarding unit performs redirect to the MUC 104.

The content server 106 may perform determination based on a terminal IP address and information, such as header information of an HTTP request and query string information of the HTTP request, which can be acquired from the HTTP request and depends on the terminal 107 or can be added by the terminal 107, the terminal 107 may perform HTTP redirect for access to the forwarding unit, and further, the forwarding unit may perform determination based on a terminal IP address and information, such as header information of an HTTP request and query string information of the HTTP request, which can be acquired from the HTTP request and depends on the terminal 107 or can be added by the terminal 107, and the terminal 107 may perform HTTP redirect for access to the MUC 104.

Accordingly, a request from the terminal 107 to the MUC 104 can be achieved without direct knowledge of the position of the MUC 104 by the content server 106. This is effective when the content server 106 and the administrator of the MUC 104 are different from each other, and can be achieved when the administrator of the MUC 104 manages a server for the forwarding unit.

This redirect message includes permanent redirect and temporary redirect, and the present embodiment can use temporary redirect or permanent redirect by performing, for the terminal 107, specification not to cache a file. Note that, when used by performing the specification not to cache a previous term file, permanent redirect can be used for temporary redirect.

Each device of the present disclosure may be achieved by a computer and a computer program, and the computer program may be recorded on a recording medium or may be provided through a network.

Industrial Applicability

The present disclosure is applicable to information communication industry.

REFERENCE SIGNS LIST

101, 103 network
102 multicast communication network
104, 501, 502 MUC
105, 401, 402, 403 UMC
106 content server
107 terminal
201 unicast request unit
202 unicast reception-cache unit
203 content transmission unit
204 content request unit
205 content reception-cache unit
206 unicast transmission unit
801, 802, 803 table

The invention claimed is:

1. A content distribution system in which a midstream zone between a terminal and a content server in a web distribution system of unicast communication is connected by using a multicast communication network, the content distribution system comprising:
 a unicast-multicast conversion device configured to convert unicast communication into multicast communication and send the multicast communication to the multicast communication network; and
 a multicast-unicast conversion device configured to convert multicast communication transmitted through the multicast communication network into unicast communication, wherein
 the multicast-unicast conversion device includes a processor and a storage medium having a computer program instructions stored herein, when executed by the processor, perform to:
 (i) identify a content group from a plurality of content groups, receive, from the multicast communication network, a content transmitted by using any one or both of unicast and multicast communication schemes for each content group, and store a content included in the content group, (ii) transmit the content to the terminal based on a request from the terminal, and (iii) selectively make a demand for a content group including the content corresponding to the request from the terminal by any one or both of unicast and multicast communication schemes; and
 the unicast-multicast conversion device includes a processor and a storage medium having a computer program instructions stored herein, when executed by the processor, perform to:
 (i) receive the content received from the content server by using unicast communication and store the content, (ii) read the content group of the content corresponding to the demand of the multicast-unicast conversion device and transmit the content group to the multicast communication network by using any one or both of unicast and multicast communication schemes, and (iii) make a demand on the content server for the content group corresponding to the request from the multicast-unicast conversion device when the content group corresponding to the request from the multicast-unicast conversion device is not stored;
 wherein the unicast-multicast conversion device divides the content into a plurality of blocks, stores the content in units of the divided blocks, and performs multicast or unicast transmission in the units of blocks, and when having received the blocks, the multicast-unicast conversion device restores the content by using the blocks.

2. The content distribution system according to claim 1, wherein the multicast-unicast conversion device determines whether the content corresponding to the request from the terminal is a content for multicast communication,
 when the content is not for multicast communication, the demand on the unicast-multicast conversion device is for a content using unicast communication, and
 when having received the demand for a content using unicast communication, the unicast-multicast conversion device transmits, to the multicast-unicast conversion device by using unicast communication, the content corresponding to the request from the terminal.

3. The content distribution system according to claim 1, wherein
 the multicast-unicast conversion device determines whether the multicast-unicast conversion device participates in a multicast group corresponding to the content corresponding to the request from the terminal,
 when the multicast-unicast conversion device participates, the demand is made on the multicast group in which the multicast-unicast conversion device participates for the content corresponding to the request from the terminal,
 when the multicast-unicast conversion device does not participate, the demand is made on the unicast-multicast conversion device for a content using unicast communication, and
 when having received the demand for a content using unicast communication, the unicast-multicast conversion device transmits, to the multicast-unicast conversion device by using unicast communication, the content corresponding to the request from the terminal.

4. The content distribution system according to claim 1, wherein
 the multicast-unicast conversion device determines whether there is a loss in the content group received from the unicast-multicast conversion device by using multicast communication,
 when there is a loss, the multicast-unicast conversion device makes a demand on the unicast-multicast conversion device for a content using unicast communication, and
 when having received the demand for a content using unicast communication, the unicast-multicast conversion device transmits, to the multicast-unicast conversion device by using unicast communication, the content corresponding to the request from the multicast-unicast conversion device.

5. The content distribution system according to claim 1, wherein the multicast-unicast conversion device determines whether there is a loss in the content group received from the unicast-multicast conversion device and, in response to determining there is a loss, make a demand on the unicast-multicast conversion device for missing content using an HTTP request.

6. A unicast-multicast conversion device connected with a midstream zone between a terminal and a content server in a web distribution system of unicast communication and configured to convert unicast communication into multicast communication and send the multicast communication to a multicast communication network, the unicast-multicast conversion device comprising a processor and a storage medium having a computer program instructions stored herein, when executed by the processor perform to: (i) receive a content from the content server by using unicast communication and store the content, (ii) read, when having received a request for a content group into which a plurality of contents are grouped from a multicast-unicast conversion device configured to convert multicast communication transmitted through the multicast communication network into unicast communication, the content group corresponding to the request from the content received from the content server and transmit the read content group to the multicast communication network by using any one or both of unicast and multicast communication schemes; and (iii) a demand on the content server for the content group corresponding to the request from the multicast-unicast conversion device when the content group corresponding to the request from the multicast-unicast conversion device is not stored;
 wherein the unicast-multicast conversion device divides the content into a plurality of blocks, stores the content in units of the divided blocks, and performs multicast or unicast transmission in the units of blocks, and when having received the blocks, the multicast-unicast conversion device restores the content by using the blocks.

7. The unicast-multicast conversion device according to claim 6, wherein the multicast-unicast conversion device determines whether the content corresponding to the request from the terminal is a content for multicast communication,
when the content is not for multicast communication, the demand on the unicast-multicast communication device is for a content using unicast communication, and when having received the demand for the content using unicast communication, the unicast-multicast conversion device transmits, to the multicast-unicast conversion device by using unicast communication, the content corresponding to the request from the terminal.

8. The unicast-multicast conversion device according to claim 6, wherein
the multicast-unicast conversion device determines whether the multicast-unicast conversion device participates in a multicast group corresponding to the content corresponding to the request from the terminal,
when the multicast-unicast conversion device participates, the demand is made on the multicast group in which the multicast-unicast conversion device participates for the content corresponding to the request from the terminal,
when the multicast-unicast conversion device does not participate, the demand is made on the unicast-multicast conversion device for a content using unicast communication, and
when having received the demand for a content using unicast communication, the unicast-multicast conversion device transmits, to the multicast-unicast conversion device by using unicast communication, the content corresponding to the request from the terminal.

9. The unicast-multicast conversion device according to claim 6, wherein
the multicast-unicast conversion device determines whether there is a loss in the content group received from the unicast-multicast conversion device by using multicast communication,
when there is a loss, the multicast-unicast conversion device makes a demand on the unicast-multicast conversion device for a content using unicast communication, and
when having received the demand for a content using unicast communication, the unicast-multicast conversion device transmits, to the multicast-unicast conversion device by using unicast communication, the content corresponding to the request from the multicast-unicast conversion device.

10. A content distribution method executed by a unicast-multicast conversion device connected with a midstream zone between a terminal and a content server in a web distribution system of unicast communication and configured to convert unicast communication into multicast communication and send the multicast communication to a multicast communication network, the content distribution method comprising a processor and a storage medium having a computer program instructions stored herein, when executed by the processor, perform to:
receiving a content from the content server by using unicast communication and storing the content;
reading, when have received a request for a content group into which a plurality of contents are grouped from a multicast-unicast conversion device configured to convert multicast communication transmitted through the multicast communication network into unicast communication, the content group corresponding to the request from the content server and transmitting the read content group to the multicast communication network by using any one or both of unicast and multicast communication schemes; and
making a demand on the content server for the content group corresponding to the request from the multicast-unicast conversion device when the content group corresponding to the request from the multicast-unicast conversion device is not stored;
wherein the unicast-multicast conversion device divides the content into a plurality of blocks, stores the content in units of the divided blocks, and performs multicast or unicast transmission in the units of blocks, and when having received the blocks, the multicast-unicast conversion device restores the content by using the blocks.

11. The content distribution method according to claim 10, wherein the multicast-unicast conversion device determines whether the content corresponding to the request from the terminal is a content for multicast communication,
when the content is not for multicast communication, the demand on the unicast-multicast communication device is for a content using unicast communication, and when having received the demand for the content using unicast communication, the unicast-multicast conversion device transmits, to the multicast-unicast conversion device by using unicast communication, the content corresponding to the request from the terminal.

12. The content distribution method according to claim 10, wherein
the multicast-unicast conversion device determines whether the multicast-unicast conversion device participates in a multicast group corresponding to the content corresponding to the request from the terminal,
when the multicast-unicast conversion device participates, the demand is made on the multicast group in which the multicast-unicast conversion device participates for the content corresponding to the request from the terminal,
when the multicast-unicast conversion device does not participate, the demand is made on the unicast-multicast conversion device for a content using unicast communication, and
when having received the demand for a content using unicast communication, the unicast-multicast conversion device transmits, to the multicast-unicast conversion device by using unicast communication, the content corresponding to the request from the terminal.

13. The content distribution method according to claim 10, wherein
the multicast-unicast conversion device determines whether there is a loss in the content group received from the unicast-multicast conversion device by using multicast communication,
when there is a loss, the multicast-unicast conversion device makes a demand on the unicast-multicast conversion device for a content using unicast communication, and
when having received the demand for a content using unicast communication, the unicast-multicast conversion device transmits, to the multicast-unicast conversion device by using unicast communication, the content corresponding to the request from the multicast-unicast conversion device.

* * * * *